Figure 1:
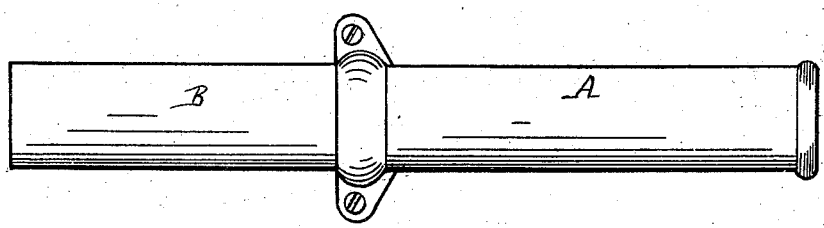
Figure 2:
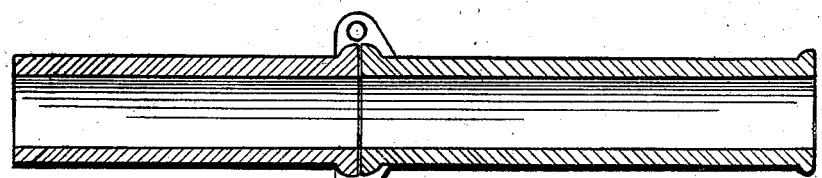
Figure 3:
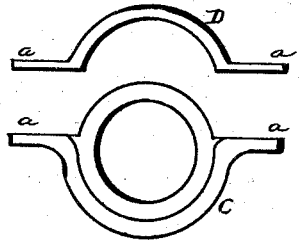

J. HOLMES.
Couplings for Gas and Water-Pipes.

No. 143,348.            Patented September 30, 1873.

Witnesses:

Inventor.
John Holmes
per
Alexander Mator
Attorneys.

AM. PHOTO-LITHOGRAPHIC CO. N.Y. (OSBORNE'S PROCESS)

UNITED STATES PATENT OFFICE.

JOHN HOLMES, OF EVANSTON, ILLINOIS, ASSIGNOR OF ONE-HALF HIS RIGHT TO GEORGE WALKER, OF SALT LAKE, UTAH TERRITORY.

IMPROVEMENT IN COUPLINGS FOR GAS AND WATER PIPES.

Specification forming part of Letters Patent No. 143,348, dated September 30, 1873; application filed June 25, 1873.

*To all whom it may concern:*

Be it known that I, JOHN HOLMES, of Evanston, in the county of Cook and in the State of Illinois, have invented certain new and useful Improvements in Gas and Water Pipe; and do hereby declare that the following is a full, clear, and exact description thereof, reference being had to the accompanying drawings and to the letters of reference marked thereon, making a part of this specification.

The nature of my invention consists in connecting the ends of pipes together by means of clips, one-half of each clip being cast upon the pipe and the other half separate, the ends of the pipe and the clips formed as will be hereinafter described.

In the annexed drawings, A and B represent two contiguous sections of pipe. Upon the end of one section is cast or formed one-half of a clip, C. This clip extends below the pipe a sufficient distance to give it strength, and at the same time allow of an annular-shaped groove to be formed in it. The other portion of the clip, D, is formed separate from the pipe, and portion is provided with ears *a a*, through which bolts pass to secure them together. One end of each section of pipe has an annular mole or flange cast upon it, which is designed to fit in the groove in the clips. In securing the ends of these sections of pipe together, the end of the pipe which has the flange upon it has said flange inserted in the groove of the stationary portion of the clip on the other section of pipe, and then the movable portion of clip is placed in position and the two are bolted together. Any suitable cement may be used in the grooves to make the joints perfectly tight.

What I claim is—

Sections of pipe having clips at one end and annular flanges at their other for securing them together, as is herein set forth.

In testimony that I claim the foregoing I have hereunto set my hand this 7th day of June, 1873.

JOHN HOLMES.

Witnesses:
P. J. HOWARD,
C. E. HUNTER.